United States Patent [19]

Watkins et al.

[11] Patent Number: 4,648,747
[45] Date of Patent: Mar. 10, 1987

[54] INTEGRAL BUOYANT RISER

[75] Inventors: Bruce J. Watkins, Palos Verdes; Albert M. Regan, Huntington Beach, both of Calif.; Bruce L. Crager, Houston, Tex.; Gary L. Fox, Hermosa Beach, Calif.; Robert C. Houlgrave, Houston, Tex.

[73] Assignee: Hughes Tool Company, Houston, Tex.

[21] Appl. No.: 748,786

[22] Filed: Jun. 26, 1985

[51] Int. Cl.⁴ .............................................. E21B 7/12
[52] U.S. Cl. .................................. 405/195; 166/350; 166/367
[58] Field of Search ................ 405/195, 169; 166/350, 166/359, 367

[56] References Cited

U.S. PATENT DOCUMENTS

| 3,330,340 | 7/1967 | Hayes et al. | 166/0.6 |
| 3,992,889 | 11/1976 | Watkins et al. | 405/195 |
| 4,040,264 | 8/1977 | Neilon | 405/195 |
| 4,176,986 | 12/1979 | Taft et al. | 405/211 |
| 4,374,595 | 2/1983 | Watkins | 285/137 A |

Primary Examiner—David H. Corbin
Attorney, Agent, or Firm—James E. Bradley

[57] ABSTRACT

A riser string for a subsea well uses the outer conduit or air can members to support the weight of the riser string. The outer conduits have flanges on their ends which are bolted together. The outer conduits have ports to admit sea water, and a gas injection system to displace some of the sea water for providing buoyancy. Mounting plates are located at each end of the outer conduits. Inner conduits for conveying well and production fluids are mounted between these mounting plates. The mounting plates are intrinsically curved in vertical cross-section, such that when the conduit flanges are bolted together, the mounting plates flatten to provide a compressive force across the faces. Metal seals are located in the holes provided in the mounting plates for the inner conduits. The inner conduits are supported along their lengths by one or more lateral supports.

6 Claims, 5 Drawing Figures

INTEGRAL BUOYANT RISER

BACKGROUND OF THE INVENTION

1. Field of the Invention

This invention relates in general to subsea well equipment, and in particular to a riser extending from a subsea well system to a floating production vessel at the surface.

2. Description of the Prior Art

In deep water subsea well systems, often a number of wells will be drilled through a subsea template, then completed. These wells may be connected to a production riser that extends normally to a floating production vessel at the surface. Well fluids flow up the production riser to the production vessel, where the fluids are treated to remove water and separate gas. The well fluids often then are pumped back down to the template and to a pipeline located on the sea floor which extends to a gathering station at a remote area.

The buoyant riser comprises sections of a central conduit which have flanges on their ends for bolting together to form a continuous riser string. Smaller diameter conduits are connected in sections and bolted around the central conduit. The smaller conduits convey production fluids from the template to the surface, with the larger central pipe being used to convey the treated well fluids back down to the subsea wells. Hydraulic pressure is also supplied through some of the smaller conduits for controlling the wells.

An air can surrounds the assembled conduits, and for each section extends downwardly to a point near the lower flange. Air is injected into the air can to displace some of the water in the air can to provide buoyancy and reduce the weight of the riser string. The structural load is carried entirely by the central conduit. The installation of such a riser system is very time consuming and expensive because of the numerous connections that must be made with each section.

SUMMARY OF THE INVENTION

The riser of this invention uses a large diameter outer conduit for supporting the load on the riser, rather than a central conduit. The outer conduit acts as the air cans, also providing buoyancy. Each outer conduit has flanges on its ends for bolting together, ports to admit water for equalizing, and air injection means for displacing the water to achieve buoyancy. A large number of inner conduits extend through the outer conduit for conveying production and control fluids. The inner conduits have ends that connect into mounting plates located on each end of the outer conduit. The plates are intrinsically formed to protrude outwardly, so that they will flatten and provide a uniform force across the plates when bolted together.

Supporting plates are located between the ends of each conduit for providing lateral support to the inner conduits. The supporting plates bolt together in varying diameter sections to position the conduits in groups, some of which will be farther from the axis of the riser than others.

BRIEF DESCRIPTION OF THE DRAWINGS

FIG. 5 is an exaggerated simplified sectional view of one of the mounting plates of the riser of FIG. 1.

DESCRIPTION OF THE PREFERRED EMBODIMENT

Figure 1:
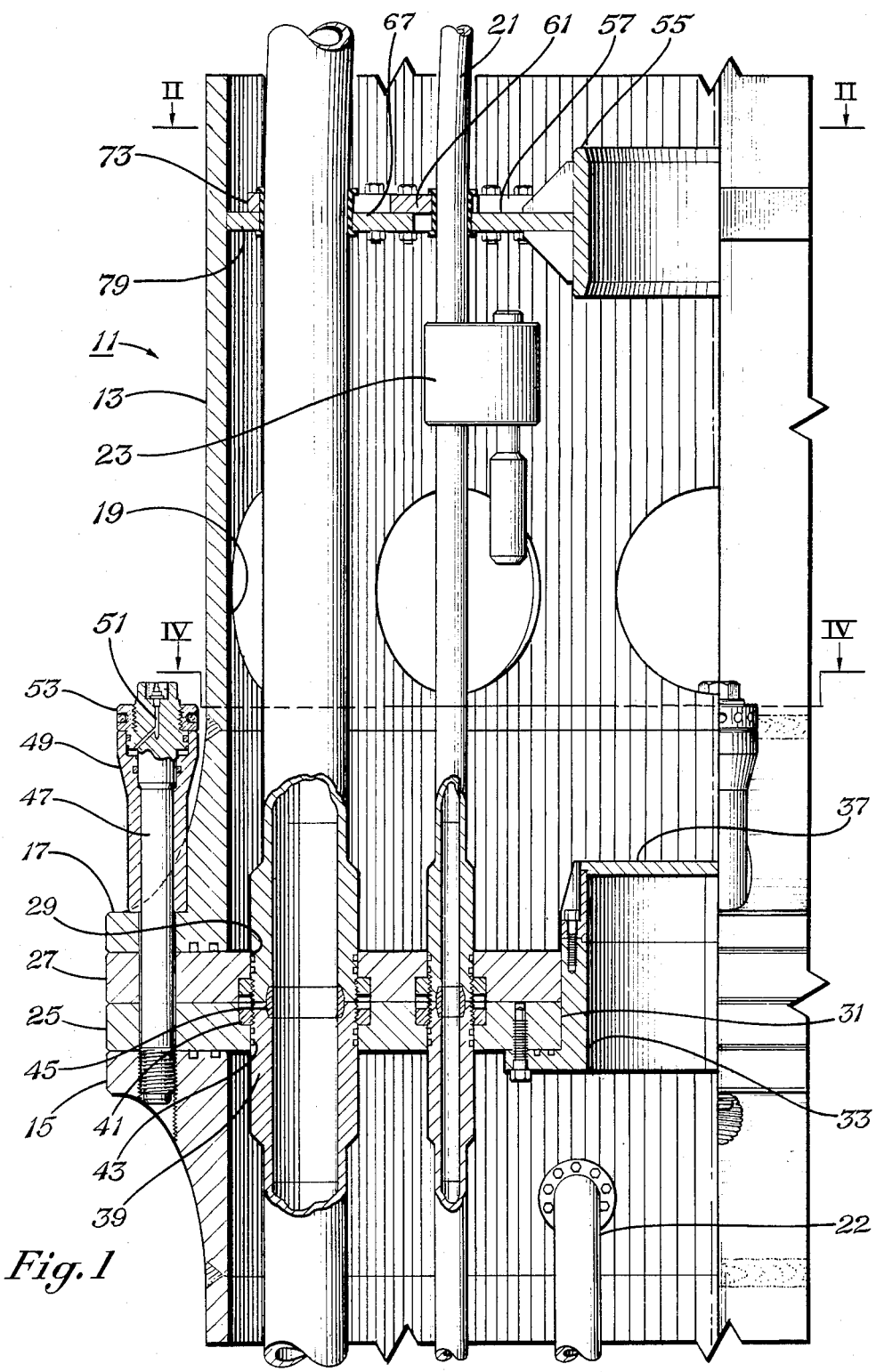
FIG. 1 is a partial vertical sectional view of a riser constructed in accordance with this invention.

Referring to FIG. 1, riser string 11 will extend from a subsea well system (not shown), normally to a floating production vessel (not shown). Riser string 11 includes an outer conduit 13. Outer conduit 13 is a large diameter pipe having sufficient structural strength to support the weight of the riser string 11 in water. Outer conduit 13 has an upper flange 15 and a lower flange 17, both of which extend radially outward and contain holes for bolting together. Each outer conduit section will be typically about 50 feet long, and will have apertures 19 near the bottom for admitting sea water.

An air injection line 21 extending through outer conduit 13 allows compressed air to be supplied to a float valve 23 to displace some of the water in the outer conduit 13 to add buoyancy. Also, the air injection system may have a bleedoff mechanism connected to a discharge port 22 for discharging air to reduce buoyancy. The air injection system will be constructed generally as taught in U.S. Pat. Nos. 3,858,401, Watkins, Jan. 7, 1975 and 3,992,889, Watkins, et al., Nov. 23, 1976, all of which material is hereby incorporated by reference.

Figure 3:
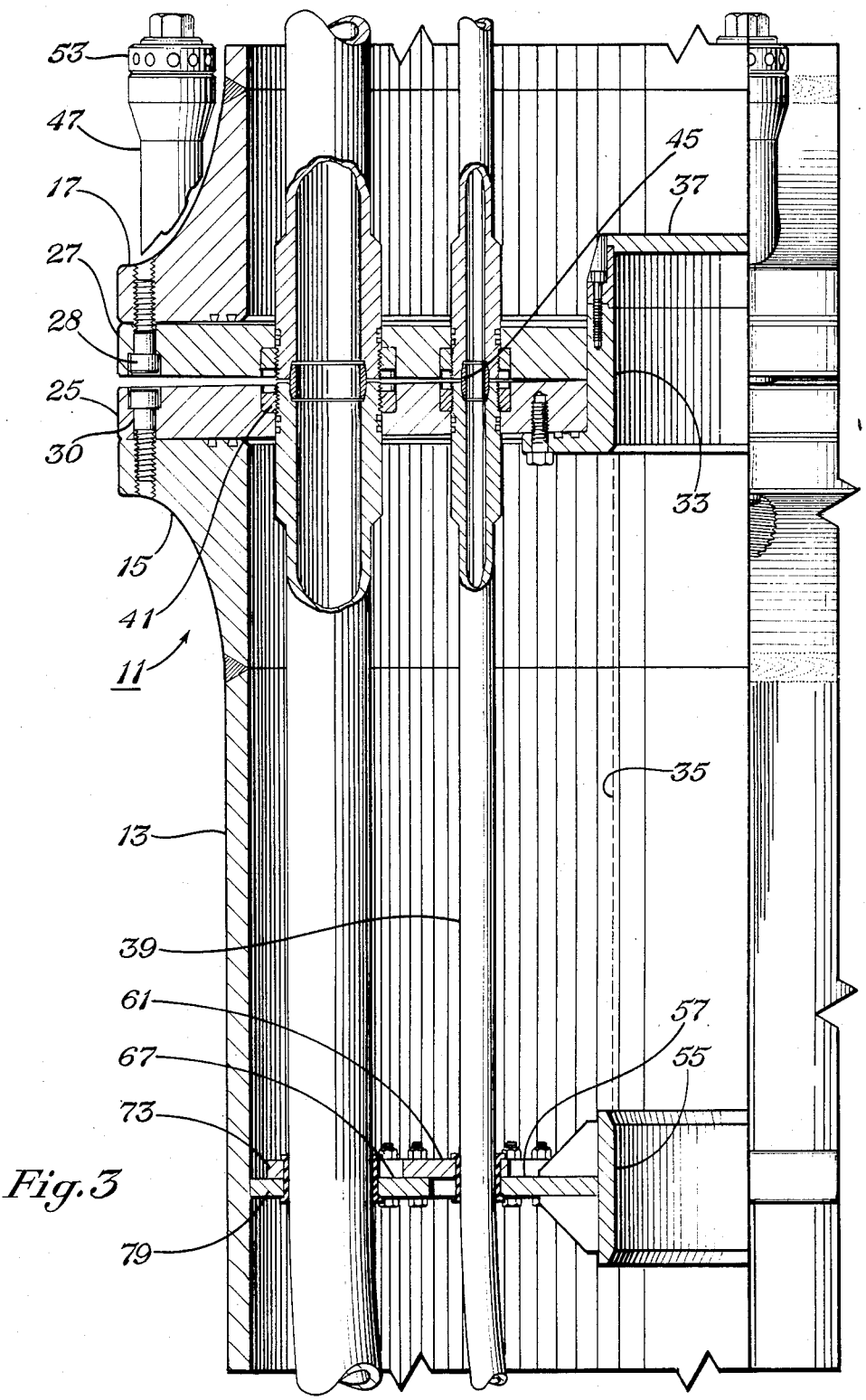
FIG. 3 is another partial vertical sectional view of the riser of FIG. 1, shown prior to bolting the two riser sections together.

Referring to FIG. 1, both the upper and lower ends of each outer conduit 11 are adapted to receive mounting plates 25 and 27, respectively. Each mounting plate 25 and 27 is a heavy metal plate containing a large number of holes 29, and a larger diameter axial aperture 31. Plate 27 is bolted to flange 17 by bolts 28 (FIG. 3). Plate 25 is bolted to flange 15 by bolts 30 (FIG. 3). As shown in FIG. 3, the plates 25, 27 are intrinsically curved in vertical cross-section so that they protrude outwardly from the interior of each outer conduit 13 prior to bolting the conduits 13 together. Consequently, when two conduit 13 ends are initially brought together, as shown in FIG. 3, only the central portion of the plates 25 and 27 will touch, leaving a clearance that increases non-linearly in a radially outward direction. When bolted together, as shown in FIG. 1, the plates 25 and 27 will flatten and fully contact each other. In the flattened condition as shown in FIG. 1, the plates will be located in planes perpendicular to the axis of the riser string 11.

Referring to FIG. 5, the intrinsic shape is shown in exaggerated form for clarity. The surfaces of plates 25, 27 are not straight frusto-conical surfaces. Rather, the surface of each plate 25, 27 is generally hyperbolic, curving below a straight line 32 extending from the edge of central aperture 31 to the outer edge of the plate. This curved surface matches the pattern of the stress that would be imposed on two flat plates bolted together at the edges. Without curvature, the preload force exerted by one flat plate against the other at the center would be very low. The forces at the edges would be high. The preload forces across the faces of the flat plates, would vary, increasing in a nonlinear manner from the inside to the outside. Providing the plates 25, 27 with the intrinsic curve as shown results in constant preload compressive forces across the faces of the plates when bolted together and flattened as shown in FIG. 1. To achieve the constant preload, the angle a between line 32 and a horizontal line should be approximately 0.6 degrees. The particular curved shape is generated in a conventional manner by a finite element computer model.

A collar 33 bolts to the lower side of upper plate 25 and protrudes through the apertures 31 of both plates 25, 27. A cap 37 bolts to the top of collar 33 to prevent communication of air from the top of one riser section to the bottom of the next upward riser section. Prior to the connection of collar 33 to the mounting plate 25, a handling tool 35 (shown schematically by dotted lines in FIG. 3) will extend through the axial collar 31, as will be explained subsequently.

A plurality of inner conduits 39 are located in the outer conduit 13, extending between plates 25 and 27. Each inner conduit 39 can be curved, as shown partly in FIG. 3, making a 180° degree spiral from the lower end to the upper end. The ends of the inner conduits 39 extend slidingly into the holes 29 in the mounting plates 25 and 27. Retaining rings or nuts 41 retain the inner conduits 39 with the mounting plates 25 and 27. The retaining nuts 41 extend into a counterbore located on the exposed side of each mounting plate 25 and 27. O-rings 43 located on the inner conduits 39 provide sealing.

The retaining nuts 41 position the extreme ends of the inner conduits 39 flush with the exposed faces of the mounting plates 25 and 27. This allows the ends of the inner conduits 39 from one outer conduit 13 to abut against the ends of the inner conduits 39 of the next outer conduit 13. A type AX metal seal 45 is adapted to fit within counterbores located in the interior of each end of each inner conduit 39. The seal rings 45 are a conventional type, having beveled smooth exteriors for providing metal-to-metal sealing when tightly compressed. The intrinsic curvature of the mounting plates 25 and 27, as shown in FIG. 3, is selected so that when the plates are flattened, as shown in FIG. 1, uniform preloading forces will exist across the face of the plates 25 and 27 to provide the necessary compression on the seal rings 45.

Figure 4:
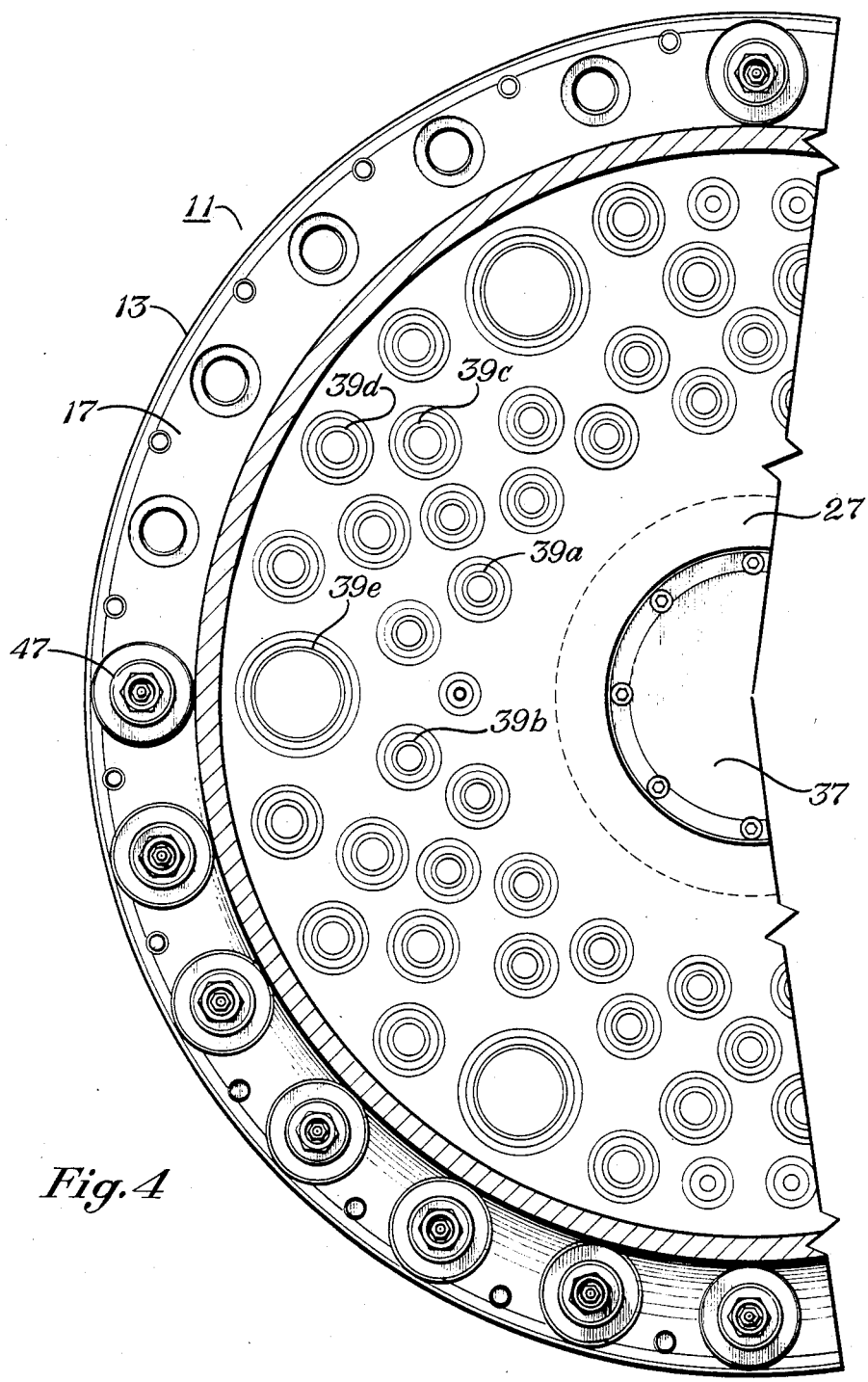
FIG. 4 is a vertical sectional view of the riser of FIG. 1, shown along the line IV—IV of FIG. 1.

In the preferred embodiment, a hydraulic type bolt 47 is used to bolt the flanges 15 and 17 together, with the plates 25 and 27 sandwiched therebetween. Bolt 47 engages threads in the upper flange 15 of the lower conduit section. Bolt 47 is rotatably carried within a sleeve 49. A hydraulic passage 51 located in bolt 47 enables high pressure hydraulic fluid to be injected between a cavity in sleeve 49 and the bolt 47. The hydraulic force tensions the bolt 47, drawing the flanges 15 and 17 together. A nut 53 is then rotated down to retain the bolt 47 and sleeve 49 in the tensioned condition. Then hydraulic pressure can be removed. FIG. 4 shows a top view of some of the bolts 47, with some not being in place.

Figure 2:
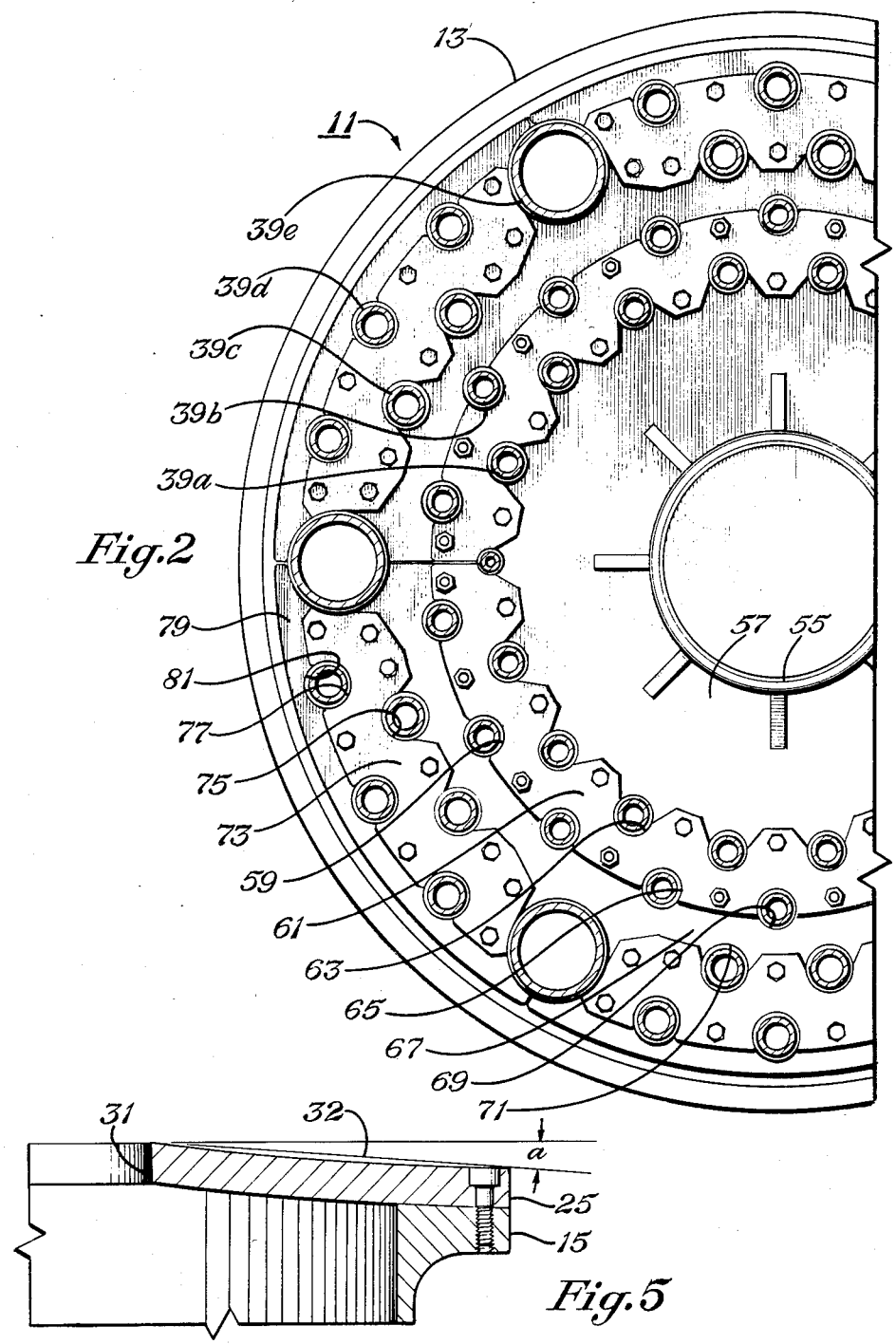
FIG. 2 is a partial sectional view of the riser of FIG. 1, taken along the line II—II of FIG. 1.

Referring to FIGS. 2 and 3, a support means exists for providing lateral support to the inner conduits 39 in their midsections between the ends. The support means includes a central ring 55 which is initially removably secured to the handling tool 35, as will be explained subsequently. An inner support plate 57 is formed with the central ring 55 and extends outwardly a selected distance. As shown in FIG. 2, the inner support plate 57 is flat, and has a circular periphery that contains a plurality of recesses 59. These recesses 59 are semicircular for receiving an innermost group 39a of the inner conduits 39.

A second support plate 61, contained in two or more sections, has on its inner edge recesses 63 which mate with the recesses 59 to define circular openings for retaining the innermost inner conduits 39a. The second support plate 61 also has recesses 65 on its outer edge for receiving a second group of inner conduits 39b. Inner conduits 39b are all located the same distance apart from each other and the same distance from the axis of the riser in the embodiment in FIG. 2.

A third support plate 67, contained in two or more sections, bolts to the second support plate 61 and extends farther outward radially. Support plate 67 has recesses 69 on its inner edges which mate with the recesses 65 to retain the second group of inner conduits 39b. The third support plate 67 has recesses 71 on its outer edge. A third group 39c of inner conduits fits within the recesses 71.

Similarly, a fourth support plate 73, located in two or more sections, bolts to the third support plate 67. The fourth support plate 73 has inner recesses 75 for retaining the third group 39c of inner conduits. Recesses 77 on the outer edge are adapted to receive a fourth group of inner conduits 39d. A retaining flange 79 with inner edge recesses 81 retains the inner conduits 39d. There may be a number of conduits 39e of larger diameter than the conduits 39a through 39d. The conduits 39e locate between recesses formed in the third support plate 67 and the retaining flange 79.

In operation, the riser sections are preferably assembled in a factory, then shipped offshore for installation. A handling tool 35 will be used to assemble the riser sections in the factory. Handling tool 35 is not shown in detail, but is a tubular member having expansible wedge members spaced apart for releasably gripping the collars 33 and rings 55. The handling tool 35 is first supported horizontally and the upper collar 33 is inserted over and gripped. An upper mounting plate 25 is connected to the collar 33. The upper ends of the innermost inner conduits 39a are inserted into the holes 29 in the upper mounting plate 25. The upper ends of the conduits 39a are secured by retaining nuts 41 with their ends flush with the upper surface of the upper mounting plate 25.

One or more central rings 55 are coupled releasably to the handling tool 35 by the wedging means (not shown) at various points along the length of the riser section. The innermost conduits 39a are inserted into the recesses 59, as shown in FIG. 2, to align them concentrically about the axis of the riser section. The second support plate 61 is coupled to the inner support plate 57 to retain the innermost inner conduits 39a against lateral movement.

Then the second concentric group of inner conduits 39b are inserted into the holes 29 in the upper mounting plate 25 and retained by retaining nuts 41. The second group of inner conduits 39b are inserted into the recesses 65 in the second support plate 61. The third support plate 67 is then bolted to the second support plate 61 to retain the second group of inner conduits 39b. This process is repeated until all of the inner conduits 39 are mounted to the upper plate 25 and supported by the support plates along their lengths.

Then, the subassembly is picked up with handling tool 35 and lowered into an outer conduit 13 until the upper plate 25 rests on the upper flange 15. The lower plate 27 will have been previously bolted to the bottom of outer conduit 13. The lower ends of the inner conduits 39 extend into the holes 29 and are secured by retaining nuts 41. Bolts 30 are secured to tighten the upper plate 25 to the outer conduit 13 in the proper orientation. After lowering the assembly to a horizontal position, the releasable gripping surfaces (not shown) of the handling tool 35 are released, and the handling tool may be withdrawn from the assembly. Cap 39 can then be coupled to the collar 33.

When installing offshore, each assembled riser section is brought into contact with the top of the riser string, which is suspended by a spider (not shown). The various holes 29 will be brought into alignment with each other as shown in FIG. 3. Then, bolts 47 (FIG. 1) are secured in the upper flange 15. Hydraulic fluid pressure is supplied through the passages 51 to tension the bolts, drawing the plates 25 and 27 together. Once the selected force has been reached, the retaining nut 53 is tightened, and the hydraulic pressure is removed. When the plates 25 and 27 tighten to each other, the curvature causes a uniform compressive force to exist on the metal seals 45 through all of the inner conduits 39. The entire riser string 11 can then be picked up, and lowered down one section and retained by spider again. The next riser section will then be assembled in the same manner as previously explained.

Air pressure will be injected through the lines 21 to displace some of the liquid in the outer conduits 13 to provide buoyancy. Production fluids will normally flow up some of the smaller diameter inner conduits 39a-39d for treatment at the surface. Treated well fluids will be pumped back down the larger diameter conduits 39e. Hydraulic fluid will also be supplied through some of the conduits 39a-39d for controlling the subsea wells. Because of temperature differences of the fluids contained therein and the different diameters, some of the inner conduits 39a-39e will expand and contract at different rates from others, and different rates from the outer conduit 13. The curvature of the inner conduits 39a-39e serves as means for allowing inner relative movement between the conduits 39 and the outer conduits 13. This curvature also prevents any of the inner conduits from absorbing any of the vertical load on the riser 11. All of the vertical load on the riser 11 will be born by the outer conduits 13. Normally, there will be no inner conduits 39 located along the axis of the riser where the handling tool 35 was positioned during assembly.

The invention has significant advantages. The installation time for the riser system should be significantly less than prior art risers, because all of the conduit connections are made when the riser sections are brought together. The outer conduits also reduce the chance for damage to the inner conduits due to wave and current motion near the surface. The mounting plates facilitate the installation, and enable the use of metal seals due to the curvature provided.

While the invention has been shown in only one of its forms, it should be apparent to those skilled in the art that it is not so limited but is susceptible to various changes without departing from the scope of the invention.

We claim:

1. A riser string extending upwardly from a subsea location, comprising in combination:
   a plurality of outer conduits;
   a plate secured to each end of each outer conduit, each plate having a plurality of holes;
   a plurality of inner conduits extending through the outer conduits for conveying production and control fluids, each inner conduit having an end that extends into one of the holes;
   port means in the outer conduits for admitting sea water into the outer conduits;
   gas injection means in the outer conduits for injecting gas into the outer conduits to provide a selected buoyancy in the riser string; and
   securing means for securing the outer conduits together with the adjacent plates of adjoining outer conduits in contact with each other, the plates being intrinsically formed with an outwardly protruding configuration, so that when compressed together by the securing mean, they flatten and exert a preload compressive force across each other, causing the inner conduits to sealingly communicate with each other.

2. A riser string extending upwardly from a subsea location, comprising in combination:
   a plurality of outer conduits;
   a plate secured to the extreme end of each outer conduit, each plate having a plurality of holes;
   a plurality of inner conduits extending through the outer conduits for conveying production and control fluids, each inner conduit having upper and lower ends that are located in the holes in the plates at each end of the outer conduit and are rigidly connected to the plates;
   securing means for securing the outer conduits together with the adjacent plates of adjoining outer conduits in contact with each other, the plates being formed with an outwardly protruding configuration, so that when compressed together by the securing means, they flatten and exert a preload compressive force across each other; and
   seal means located between the adjacent ends of adjoining inner conduits for sealing the adjoining inner conduits to each other, the seal means being axially compressed into sealing engagement by the coupling of the plates together.

3. A riser string extending upwardly from a subsea location, comprising in combination:
   a plurality of outer conduits for providing buoyancy and supporting the weight of the riser string;
   a plate secured to each end of each outer conduit, each plate having a plurality of holes and an outer side and an inner side;
   a plurality of inner conduits located in the outer conduit for conveying production and control fluids, each inner conduit having ends that are secured in the holes in the plates, each end of each inner conduit being substantially flush with the outer side of the plate to which it is secured;
   securing means for securing the outer conduits together with the plates disposed therebetween and the outer sides in contact with each other with the holes in alignment; and
   seal means for sealing the ends of the inner conduits to the plates to which they are secured and to each other when the outer conduits are secured to each other.

4. A riser string extending upwardly from a subsea location, comprising in combination:
   a plurality of outer conduits for providing buoyancy and supporting the weight of the riser string;
   a plate secured to each end of each outer conduit, each plate having a plurality of holes and an outer side and an inner side;

a plurality of inner conduits located in each of the outer conduits for conveying production and control fluids, each inner conduit having ends that are rigidly and sealingly secured in the holes in the plates, the ends of the inner conduits being substantially flush with the outer side of the plates to which they are secured;

securing means for securing the outer conduits together with the outer sides of the plates in contact with each other and with the holes in alignment;

the plates being intrinsically formed with an outwardly protruding configuration, so that when compressed together by the securing means they flatten and exert a preload compressive force across each other and seal means located between the adjacent ends of adjoining inner conduits for sealing the adjoining inner conduits to each other, the seal means being axially compressed into sealing engagement by the coupling of the plates together.

5. A riser string extending upwardly from a subsea location, comprising in combination:

a plurality of outer conduits for providing buoyancy and supporting the weight of the riser string;

means for connecting the ends of the outer conduits together to form a continuous riser string;

a plurality of inner conduits extending through each of the outer conduits for conveying production and control fluids;

the inner conduits being spaced from the axis of the outer conduit in at least three groups at different distances from the axis of the outer conduit, the groups comprising an innermost group, an intermediate group, and an outermost group;

a central ring adapted to be located between the ends of the outer conduit;

an inner support plate mounted to the central ring and having a circular periphery containing a plurality of recesses for receiving the innermost inner conduits;

an intermediate support plate secured to the inner support plate, having an inner edge that contacts the outer side of the innermost inner conduits and an outer edge containing a plurality of recesses for receiving the intermediate inner conduits;

an outer support plate secured to the intermediate support plate, having an inner edge that contacts the outer sides of the intermediate inner conduits and an outer edge containing a plurality of recesses for receiving the outermost inner conduits; and retaining means for retaining the outermost inner conduits with the outer support plate.

6. A method of assembling a riser section, comprising in combination:

providing an upper mounting plate with a plurality of holes and an axial aperture;

positioning a tubular handling tool through the aperture and releasably securing the mounting plate to the handling tool;

positioning a central ring around the handling tool spaced from the mounting plate and providing the central ring with an inner support plate extending radially outward and having a plurality of recesses on its periphery;

securing the upper ends of a plurality of innermost inner conduits to the mounting plate and placing the innermost inner conduits in the recesses;

securing an intermediate support plate to the inner support plate, with the intermediate support plate having an inner periphery contacting the innermost inner conduits to retain them, the intermediate support plate having an outer periphery containing recesses;

securing upper ends of a plurality of intermediate inner conduits to the mounting plate and placing the intermediate inner conduits in the recesses of the intermediate support plate;

securing an outer support plate to the intermediate support plate, with the outer support plate having an inner periphery contacting the intermediate inner conduits to retain them, the outer support plate having an outer periphery containing recesses;

securing upper ends of a plurality of outermost innter conduits to the mounting plate and placing the outermost inner conduits in the recesses of the outer support plate, and retaining them with the outer support plate; and inserting the mounting plate and assembled inner conduits into an outer conduit, then removing the handling tool.

* * * * *